United States Patent
McKay et al.

(10) Patent No.: US 10,977,201 B1
(45) Date of Patent: Apr. 13, 2021

(54) PER IO DIRECT MEMORY ACCESS REDIRECTION

(71) Applicant: Avago Technologies International Sales Pte Limited, Singapore (SG)

(72) Inventors: Luke E. McKay, Rose Hill, KS (US); Roger T. Clegg, Wichita, KS (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 832 days.

(21) Appl. No.: 14/447,339

(22) Filed: Jul. 30, 2014

Related U.S. Application Data

(60) Provisional application No. 61/903,708, filed on Nov. 13, 2013.

(51) Int. Cl.
*G06F 13/28* (2006.01)
*G06F 13/40* (2006.01)

(52) U.S. Cl.
CPC .......... *G06F 13/28* (2013.01); *G06F 13/4027* (2013.01)

(58) Field of Classification Search
CPC ............................. G06F 13/28; G06F 13/4027
See application file for complete search history.

(56) References Cited

U.S. PATENT DOCUMENTS

| | | | |
|---|---|---|---|
| 6,021,462 A * | 2/2000 | Minow | G06F 3/061 711/111 |
| 7,613,847 B2 | 11/2009 | Kjos et al. | |
| 7,617,333 B2 | 11/2009 | Pettey | |
| 2010/0161936 A1* | 6/2010 | Royer | G06F 3/061 711/209 |
| 2011/0145447 A1* | 6/2011 | Dimond | G06F 13/28 710/23 |
| 2013/0086311 A1* | 4/2013 | Huang | G06F 13/1689 711/103 |
| 2013/0138841 A1* | 5/2013 | Xu | G06F 13/28 710/26 |
| 2015/0127882 A1* | 5/2015 | Carlson | G06F 12/0246 711/103 |

OTHER PUBLICATIONS

Intel® Virtualization Technology for Directed I/O, Architectgure Specification—Rev. 1.3, Feb. 2011, Copyright © 2011, Intel Corporation, pp. 1-152.

* cited by examiner

*Primary Examiner* — Idriss N Alrobaye
*Assistant Examiner* — Brooke J Taylor
(74) *Attorney, Agent, or Firm* — Morgan, Lewis & Bockius LLP

(57) ABSTRACT

A bridge device tracks each individual IO between two PCIe busses and provides a translated address based on a scatter/gather list. Tracking provides a natural means of scatter/gather list translation to and from a native PCIe storage protocol's scatter/gather list (or other scatter/gather like mechanism). In addition, the awareness of the IO context provides a means for detecting erroneous transactions that would otherwise cause a system error and/or data corruption to be aborted preventing those error scenarios.

20 Claims, 7 Drawing Sheets

PER IO DIRECT MEMORY ACCESS REDIRECTION

PRIORITY

The present application claims the benefit under 35 U.S.C. § 119(e) of U.S. Provisional Application Ser. No. 61/903,708, filed Nov. 13, 2013, which is incorporated herein by reference.

BACKGROUND OF THE INVENTION

With the adoption of peripheral component interconnect express (PCIe) based storage protocols, there is a need to provide error handling and fault tolerance. In existing systems, peripheral component interconnect express based devices produce errors in situations such as asynchronous insertion or removal. Physically removing a peripheral component interconnect express device currently connected to a system will result in a system error. Additionally, if a peripheral component interconnect express based device performs an erroneous action with host memory, the action can cause a system error, or it could pass unnoticed as silent data corruption. The only existing partial solutions are Access Control Services (ACS) as defined in the PCIe specification and the new Downstream Port Containment that some proprietary PCIe switches may provide in the future. The partial solution handled by ACS can help prevent the PCIe storage devices from corrupting certain portions of system memory such as the OS specific areas but it cannot insure that all data was transferred nor can it protect all memory on a per IO basis. The partial solution handled by DPC will help to prevent the propagation of an unrecoverable error to the host when an end device is removed or otherwise has an error, but it will not prevent an end device from corrupting host memory.

SUMMARY OF THE INVENTION

Accordingly, the present invention is directed to a novel method and apparatus for monitoring direct memory access between a device and the host while insuring the end device does not attempt access outside its permitted address range in addition to potentially insuring that all relevant data is transferred for each IO.

In one embodiment, the invention is aware of commands issued to connected peripheral component interconnect express storage devices. The invention insures the devices only access memory locations associated with the IO requests that are issued. This prevents inadvertent memory accesses. Because the invention controls access to memory space on a per IO basis, the computer system can gracefully handle any errors that occur due to the asynchronous removal of a device, as well as a means to abstract the resources that might need to be allocated when a device is asynchronously added.

In another embodiment, a computer apparatus isolates errors and tracks the status of block based peripheral component interconnect storage device IO requests. The computer utilizes per IO direct memory access redirection, which isolates errors and provides a mechanism to track the status of an IO request that is being executed by an independent peripheral component interconnect storage device direct memory access engine.

Embodiments of the present invention track each individual IO and provide a translated address based on a scatter/gather list. Such tracking provides a natural means of scatter/gather list translation to/from the native peripheral component interconnect express storage protocol's scatter/gather list (or other scatter/gather like mechanism). In addition, the awareness of the IO context provides a means for terminating erroneous transactions that would otherwise cause a system error and/or data corruption preventing those error scenarios.

When a peripheral component interconnect express device is added to the peripheral component interconnect tree, embodiments of the present invention isolate resources required for the new device from the system that will receive the benefit. Likewise, when a peripheral component interconnect express storage device is removed from a system, transactions are completed by the invention to or from the host preventing system errors.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
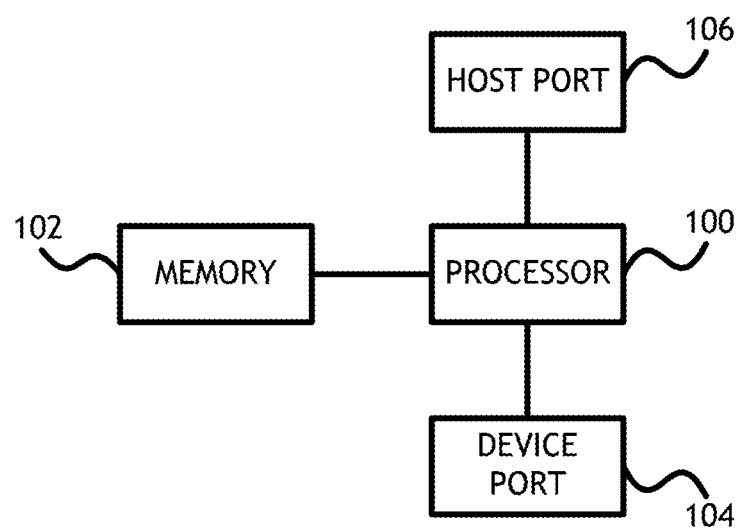
FIG. 1 shows a block diagram of a computer apparatus useful for implementing embodiments of the present invention.

Referring to FIG. 1, a block diagram of a computer apparatus useful for implementing embodiments of the present invention is shown. In at least one embodiment, the apparatus is a bridge device including a processor 100. The processor 100 may be configured to execute computer executable program code, or the processor 100 may be configured as a plurality of state machines for executing predefined operations. The bridge device further includes memory 102 in communication with the processor 100, and at least one host port 106 and at least one device port 104 connected to the processor 100.

When a peripheral component interconnect express storage device is removed from a system a typical system will have a system error this is due to the peripheral component interconnect transactions that were pending at the time of the removal. Transactions typically cannot be completed allowing for completion timeouts and other link errors. Also, many peripheral component interconnect express storage devices do not support single root IO virtualization.

In at least one embodiment, the processor 100 isolates an address space associated with the host port 106 and an address space associated with the device port 104. In One embodiment, the isolated address spaces are contained in the memory 102.

The processor 100 receives IO instructions either from a host connected to the host port 106 or a device connected to the device port 104. The processor 100 translates addresses between the host address space and the device address space via a scatter/gather list translation mechanism and executes the IO operations accordingly. In one embodiment, scatter/gather lists are pulled locally to associate transfers between separate memory spaces. Each IO transaction has its own scatter/gather list. In at least one embodiment, scatter/gather entries in the scatter/gather lists include memory space type and address information, and therefore can specify a host port in the scatter/gather list or "memory" if internal memory is desired.

In at least one embodiment, the processor 100 provides an address range in the device side memory space that allows for dynamic translation to other memory space addresses. Based on the IO context, the processor 100 allows access to host memory or internal memories, allows unique end device identification and allows unique IO context identification. Unique end device identification is helpful for error identification and recovery. Unique IO identification is required for context sensitive host address mapping. Inbound address maps allow access from devices to a processor 100 local bus or host. Outbound maps allow access from processor 100 local bus or host to connected devices. Peripheral data bus devices do not natively handle regular scatter/gather lists. Translation is required before sending the IO request to a peripheral component interconnect express end device. Basic translation can be performed by hardware; more complex translation is performed by firmware. To improve translation speed, a host driver generates a native translation table type data structure such as a scatter/gather list.

Embodiments of the present invention allow storage devices to be accessible and isolated in a manner consistent with serial attached small computer system interface/serial advanced technology attachment based targets.

Figure 2:
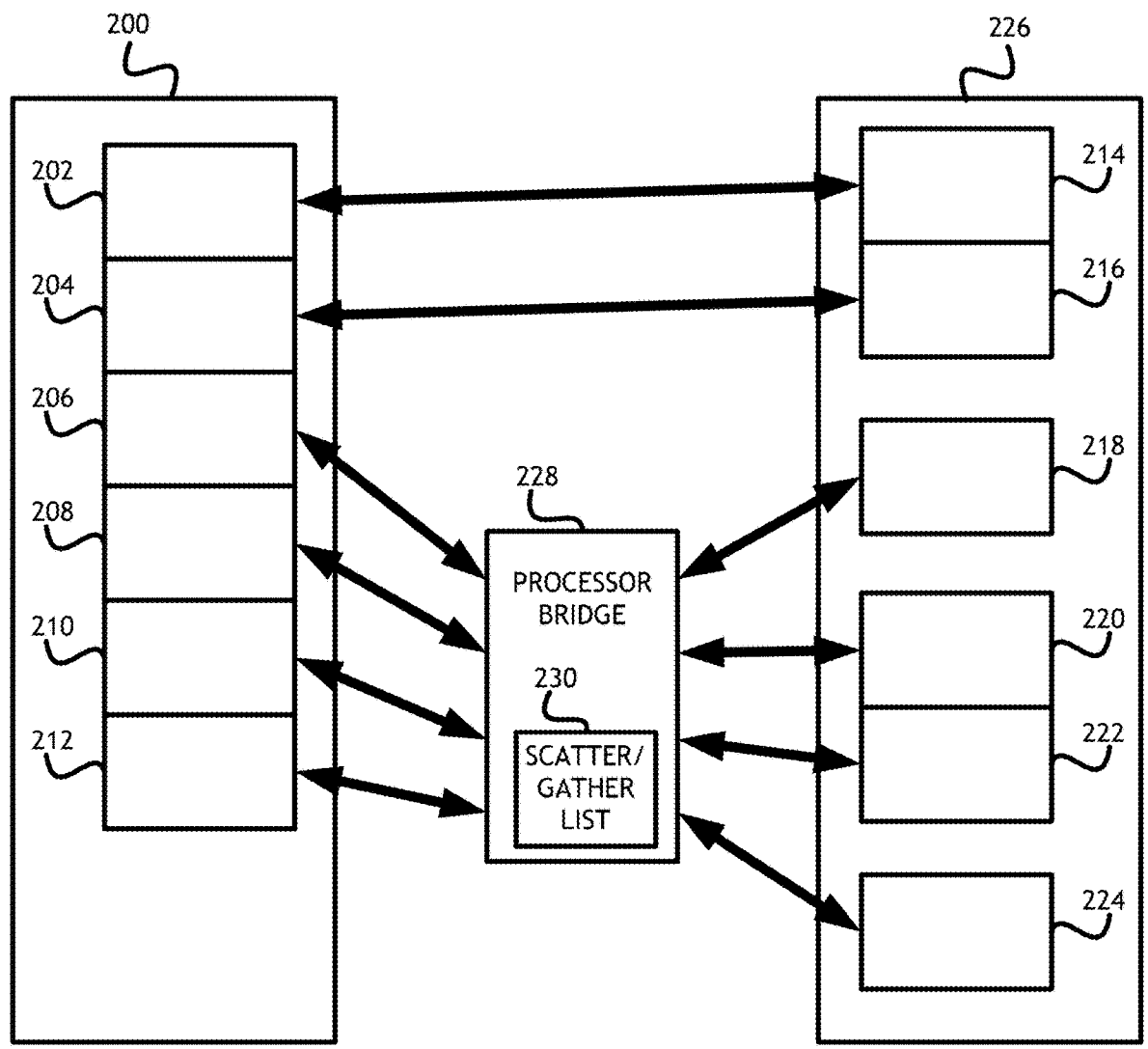
FIG. 2 shows block diagram illustrating address mapping for direct memory access redirection.

Referring to FIG. 2, block diagram illustrating address mapping for direct memory access redirection is shown. Peripheral component interconnect express devices have built in direct memory access engines, and therefore move their own data. For example, a device side memory space 200 includes contiguous blocks of device side memory addresses 202, 204, 206, 208, 210, 212. Each device side memory address block 202, 204, 206, 208, 210, 212 is associated memory block in another address space. In one example, each device side memory address block 202, 204, 206, 208, 210, 212 is associated with a host side memory address block 214, 216, 218, 220, 222, 224 in a host side memory address space 226. In this example, the host side memory address blocks 214, 216, 218, 220, 222, 224 are discontiguous. While the example described a host memory space 226, double data rate or internal memory are also envisioned.

During direct memory access operations, IO operations directed toward a device side memory address block 202, 204, 206, 208, 210, 212 are translated to a host side memory address block 214, 216, 218, 220, 222, 224. Not all back end peripheral component interconnect express memory needs to be allocated to the direct memory access redirector memory space. Some can be allocated to standard internal memory for command usage. Memory allocation prevents a bridge device 228 from accessing memory outside a particular range.

In at least one embodiment, a bridge device 228 determines a memory address offset of a device side memory address block 202, 204, 206, 208, 210, 212 in the device side memory space 200. That memory address offset are memory block size are then added to a scatter/gather list 230 or other comparable translation mechanism in the bridge device 228 to target and map one or more appropriate host side memory address blocks 214, 216, 218, 220, 222, 224 in the host memory address space 226 for each IO operation.

The direct memory access redirector block translates a memory request from a back end peripheral component interconnect express device into a corresponding internal processor bus (memory) address. The memory request is generally a host memory request.

First a command translator creates a command. The command translator may be embodied in a host, controller firmware or controller hardware or some combination thereof. In some embodiments, the command translator translates an original command scatter/gather list to a native protocol specific scatter/gather list. When performing the scatter/gather list translation, the data address and protocol specific scatter/gather list contained within the command could be specific constant values for the unique message identifier associated with that command. In at least one embodiments, the simple protocol specific scatter/gather list is arranged such that it is using a flat memory space, i.e. the data starts at some address and ends at some higher address that is exactly the length of the IO. The requested offset from the base is the exact data offset into the data memory being accessed.

When a back end peripheral component interconnect device creates a memory read/write request the address that it accesses provides some context information because the base address of each message identifier is already known. The offset from the base address is also known. This information allows the discovery of the original message and the original message scatter/gather list. Based on the base address and offset, the exact memory space (whether internal memory or host memory) and exact memory address can be determined. Once memory address calculations are completed, the location can be accessed and a reply sent back to the back end peripheral component interconnect express device as necessary.

The use of memory address space according to embodiments of the present invention allows any virtual function on the host side to access any backend peripheral component interconnect express end device. Memory address spaces comprise a generic layer between a host device and an end data storage device. It also allows a command generator to pass a simple protocol specific scatter/gather list to the end device so that the memory space that it is accessing can be contiguous. Contiguous memory space allows the host side data to use the native scatter/gather list and eliminates the need for inbound to outbound map decode mechanisms. The translation is executed in real-time such that a memory read/write request comes in on the backend and the correct bus number or ARID is immediately calculated from the message ID and scatter/gather list.

Figure 3:
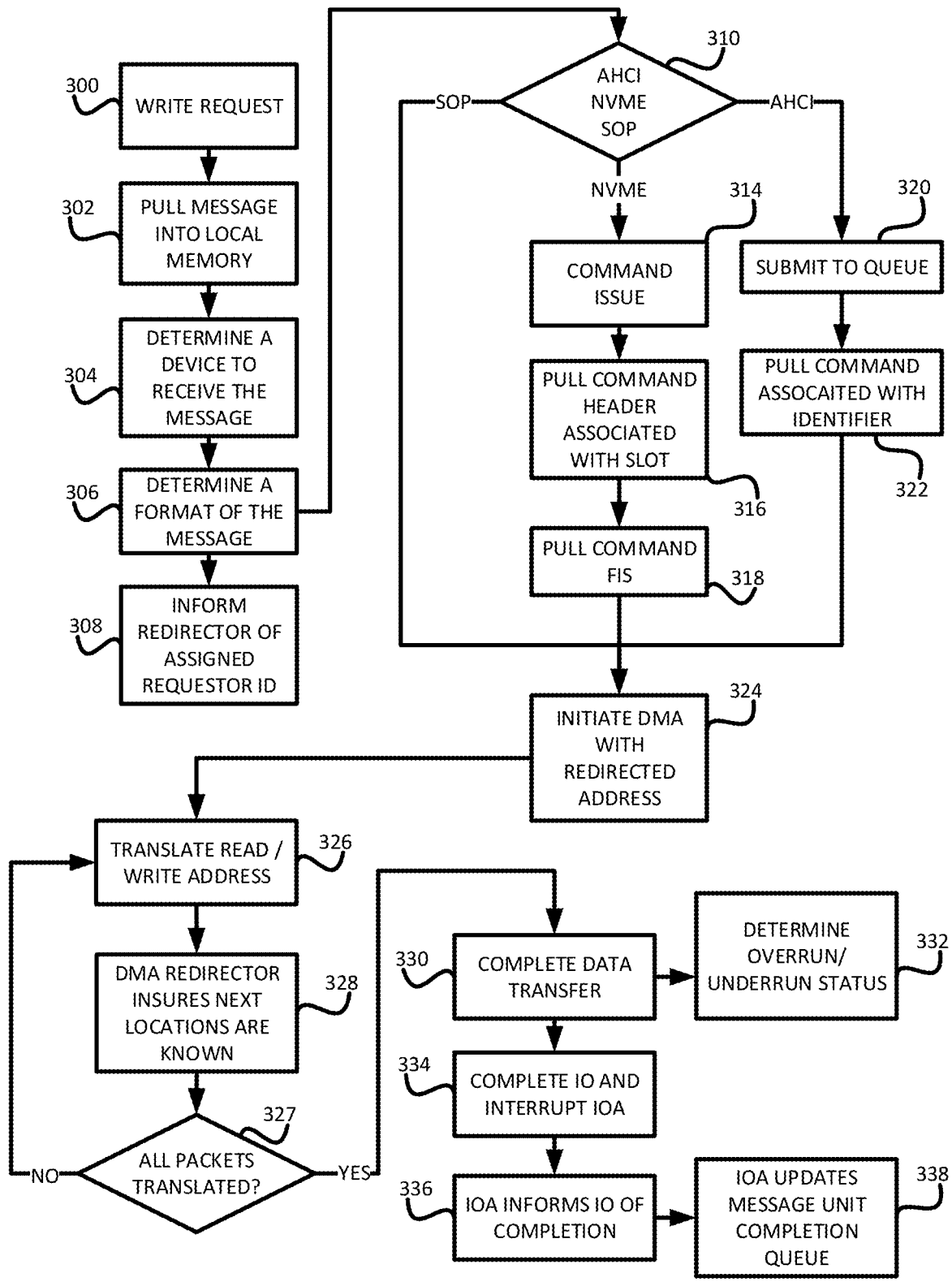
FIG. 3 shows a flowchart of a method for input/output flow during direct memory access redirection.

Referring to FIG. 3, a flowchart of a method for IO flow during direct memory access redirection is shown. In at least one embodiment, a processor receives 300 a write request from a host. In one embodiment, the write request is placed in a queue. The processor pulls 302 the message to be written into a memory space local to the processor. The processor then determines 304 a device that will receive the message such as a particular peripheral component interconnect express device connected to the processor.

An IO adapter determines 306 a format for the message. In at least one embodiment, the IO adapter translates the message to a native format with reference to a scatter/gather list. In at least one embodiment, the scatter/gather list associates a device memory address space with a host memory address space. The processor then informs 308 a direct memory access redirector that the message identifier is associated with a requestor identifier. Once the format is determined, a command is issued to the end device.

In at least one protocol specific embodiment, the process of issuing a command to an end device includes determining 310 the type of memory bus interface; advanced host controller interface, nonvolatile memory express or SOP (small computer system interface over peripheral component interconnect express). In the event the type is determined 310 to be SOP, the device initiates 324 direct memory access to or from the redirected address. In the even the type is determined 310 to be nonvolatile memory express, the processor issues 314 the IO command. The corresponding device then pulls 316 a command header associated with the IO command slot and pulls 318 the command frame information structure and initiates 324 direct memory access to or from the redirected address. In the even the type is determined 310 to be advanced host controller interface, the IO command is submitted 320 to a queue for execution. The corresponding device the pulls 322 the IO command associated with the command identifier and initiates 324 direct memory access to or from the redirected address.

After initiating 324 direct memory access to or from the redirected address, the processor translates 326 the redirected memory address associated with a data packet to a host memory address. In at least one embodiment, the translation 326 is based on a data offset and scatter/gather list in the original message. The direct memory access redirector insures 328 that data locations corresponding to the data transfer are known. In at least one embodiment, the redirector insures 328 that data locations are known by counting individual bytes. Where a message includes more than one data packet, the processor determines 327 if all of the data packets have been translated. If not, the processor moves to the next data packet and translates 326 the corresponding memory addresses. The process continues until all packets have been processed.

Once all packets are processed, the processor then completes 330 the data transfer. The direct memory access redirector determines 332 if an overrun or underrun status exists based on the known memory addresses and byte count calculated when the redirector insured 328 that memory locations were known. The device then completes 334 the IO transaction and interrupts the host IO adapter. The device input output adapter informs 336 the processor IO adapter of transfer completion and the processor IO adapter updates 338 a message unit completion queue to complete the IO transaction. When a transfer is complete, the processor can verify the amount of data that was transferred. A person skilled in the art would appreciate that data comes in variable sized discrete packets. Individual packets of whatever packet size are translated 326 based on each packets offset from the flat space allocated in the device memory address space.

Figure 4:
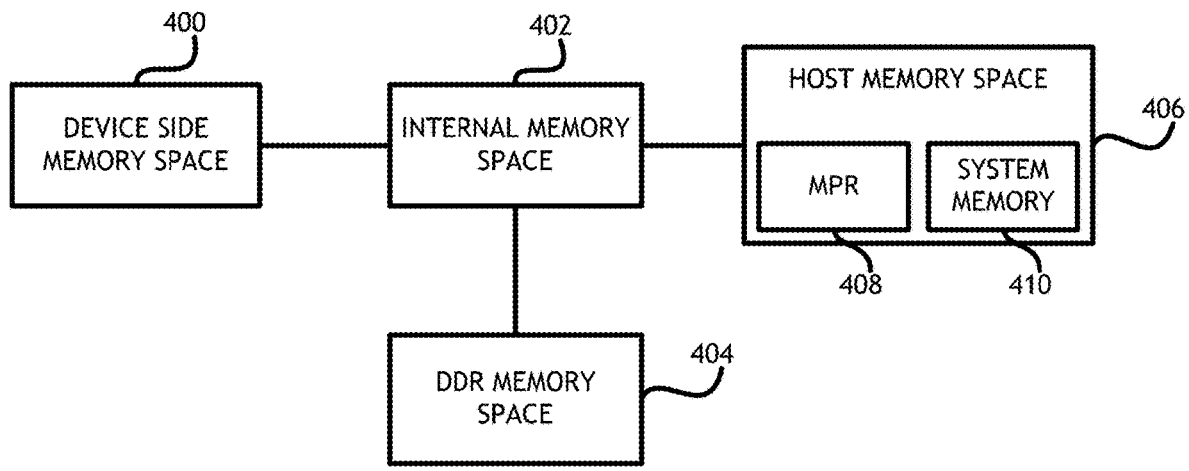
FIG. 4 shows a block diagram of a system for separating memory spaces.

Referring to FIG. 4, a block diagram of a system for separating memory spaces is shown. A controller memory space includes a device side memory space portion 400, a host side memory space portion 406, a double data rate memory space portion 404 and an internal memory space portion 402. In at least one embodiment, a portion of the double data rate memory space portion 404 is mapped to the internal memory space portion 402. Likewise, a portion of the device side memory space portion 400 is mapped to a portion of the internal memory space portion 402.

In at least one embodiment of the present invention, the host side memory space portion 406 includes one or more message processing memory space 408. In the present context, message processing memory space 408 may comprise one or more memory registers. The message processing memory space 408 is accessed directly by a host. Devices connected to the controller cannot directly access host system memory 410; therefore the controller processor translates messages in the message processing registers 408 to memory locations in the internal memory space portion 402, and thereby to the device side memory space portion 400.

Figure 5:
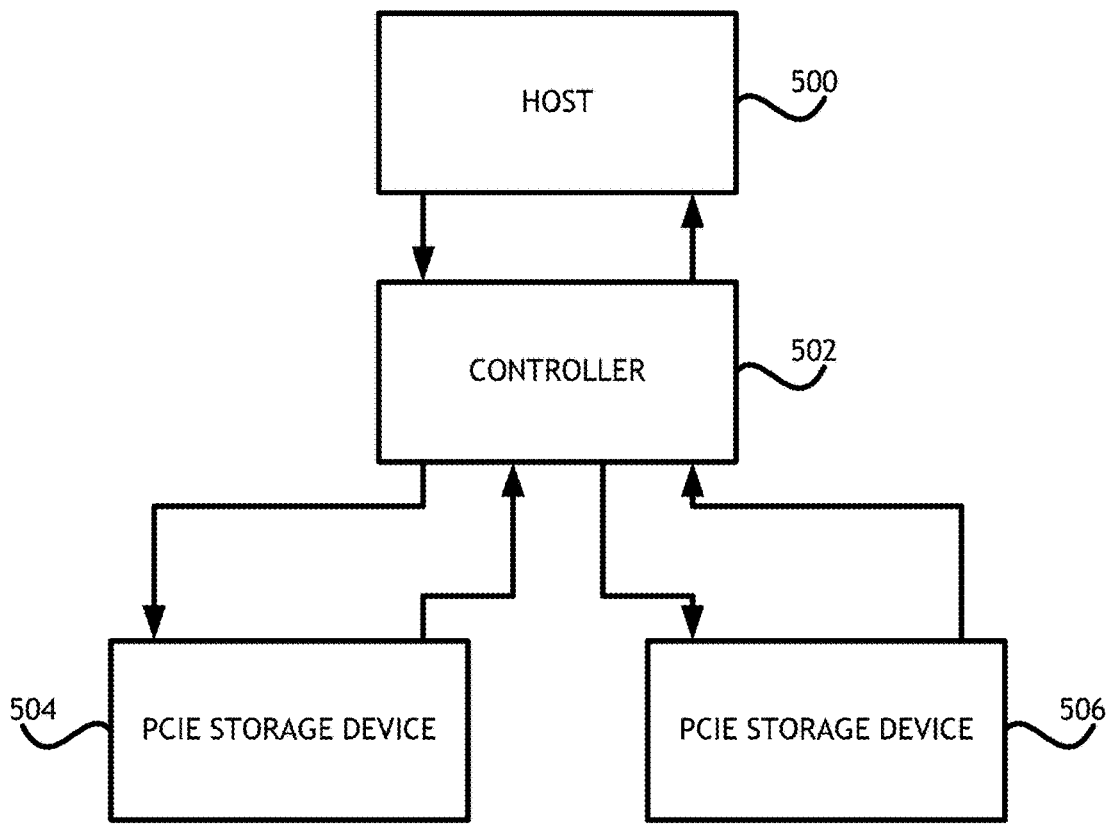
FIG. 5 shows a block diagram of a system for implementing embodiments of the present invention.

Referring to FIG. 5, a block diagram of a system for implementing embodiments of the present invention is shown. A host device 500 connected to a controller 502 sends and receives IOs to one or more peripheral component interconnect express storage devices 504, 506. The controller 502 includes internal memory, a portion of the internal memory is mapped to internal memory in the host device 500 and a portion of the internal memory is mapped to portions of the one or more peripheral component interconnect express storage devices 504, 506. A processor in the controller 502 produces scatter/gather lists for each IO to facilitate translation of memory addresses between the host mapped and device mapped portions. Furthermore, the processor maintains message processing registers to internally store IO messages while the processor translates memory addresses and moves data between internal memory blocks according to the scatter/gather list. The processor then sends appropriate data commands to the host device 500 or the one or more peripheral component interconnect express storage devices 504, 506 as necessary.

Figure 6:
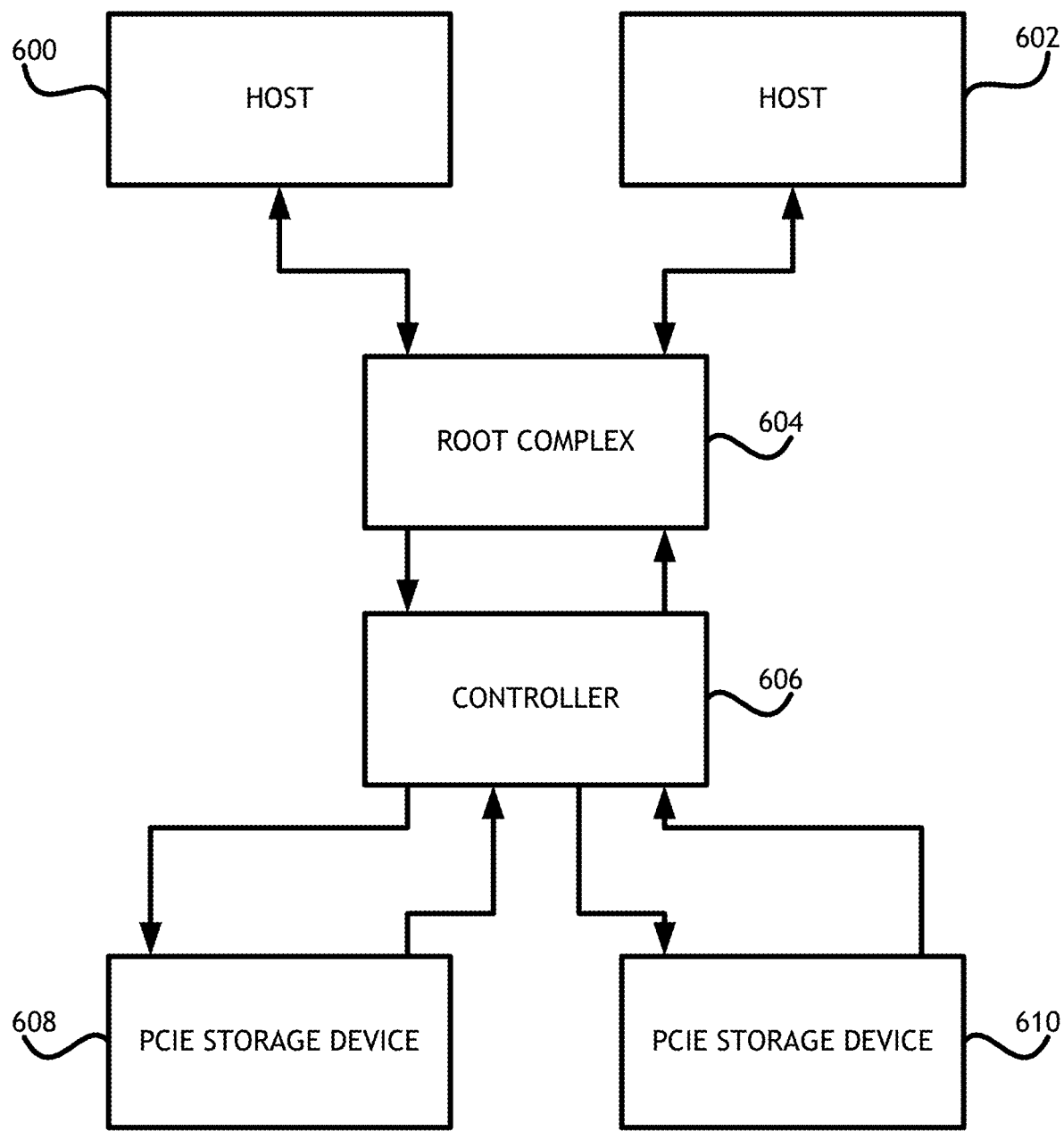
FIG. 6 shows a block diagram of a system for implementing embodiments of the present invention.

Referring to FIG. 6, a block diagram of a system for implementing embodiments of the present invention is shown. A one or more host devices 600, 602 connected to a controller 606 through a root complex 604 sends and receives IOs to one or more peripheral component interconnect express storage devices 608, 610. In at least one embodiment, the root complex 604 is part of a single-root IO virtualization (SRIOV) system. In another embodiment, the root complex 604 is part of a multi-root IO virtualization (MRIOV) system. The controller 606 includes internal memory, a portion of the internal memory is mapped to internal memory in the one or more host devices 600, 602 and a portion of the internal memory is mapped to portions of the one or more peripheral component interconnect express storage devices 608, 610. A processor in the controller 606 produces scatter/gather lists for each IO to facilitate translation of memory addresses between the host mapped and device mapped portions. Furthermore, the processor maintains message processing registers to internally store IO messages while the processor translates memory addresses and moves data between internal memory blocks according to the scatter/gather list. The processor then sends appropriate data commands to the one or more host devices 600, 602 or the one or more peripheral component interconnect express storage devices 608, 610 as necessary.

Figure 7:
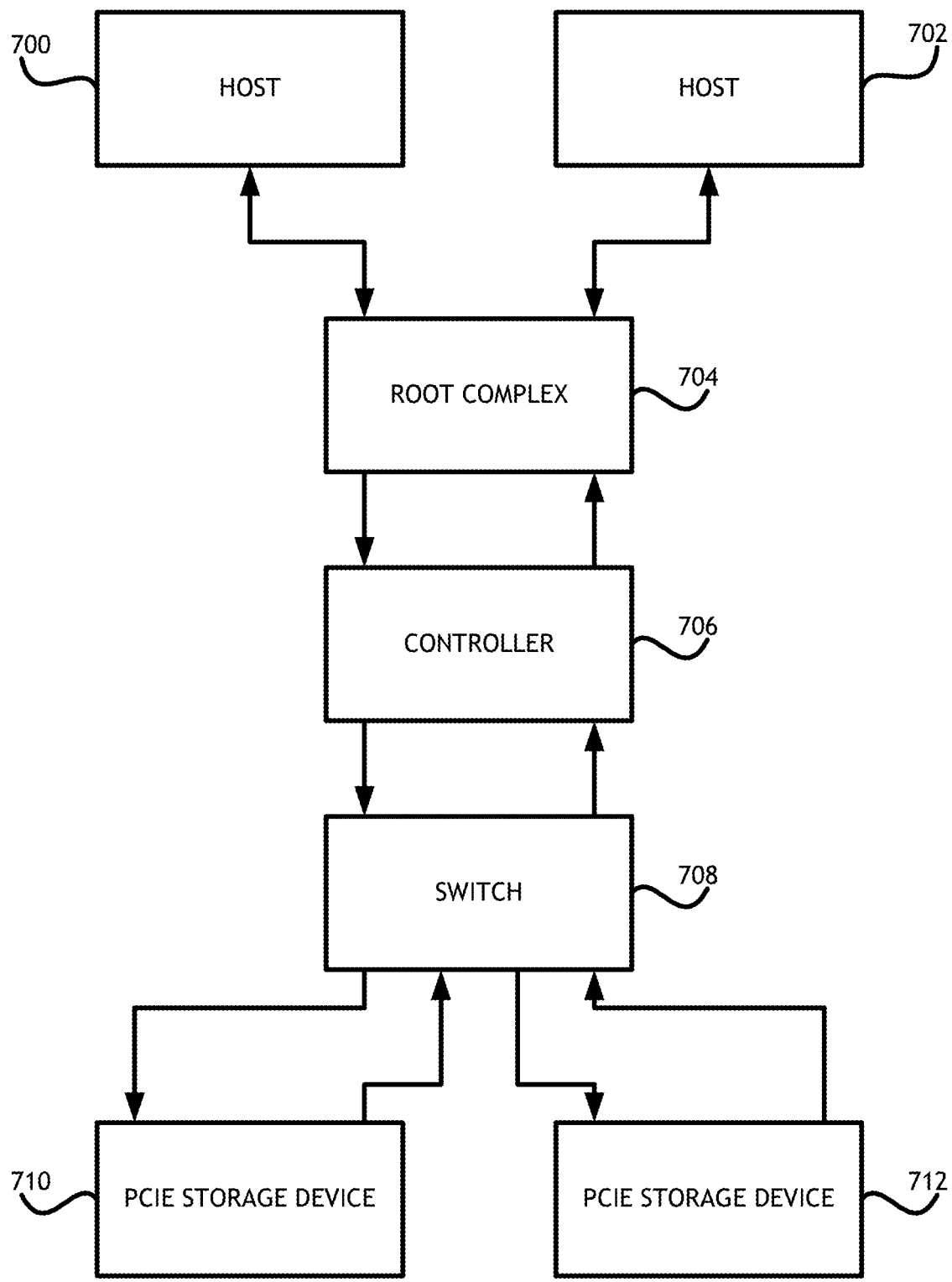
FIG. 7 shows a block diagram of a system for implementing embodiments of the present invention.

Referring to FIG. 7, a block diagram of a system for implementing embodiments of the present invention is shown. A one or more host devices 700, 702 connected to a controller 706 through a root complex 704 sends and receives IOs to one or more peripheral component interconnect express storage devices 710, 712. The controller 706 includes internal memory, a portion of the internal memory is mapped to internal memory in the one or more host devices 700, 702 and a portion of the internal memory is mapped to portions of the one or more peripheral component interconnect express storage devices 710, 712 connected to the controller 706 through a switch 708. A processor in the controller 706 produces scatter/gather lists for each IO to facilitate translation of memory addresses between the host mapped and device mapped portions. Furthermore, the processor maintains message processing registers to internally store IO messages while the processor translates memory addresses and moves data between internal memory blocks according to the scatter/gather list. The processor then sends appropriate data commands to the one or more host devices 700, 702 or the one or more peripheral component interconnect express storage devices 710, 712 as necessary.

Figure 8:
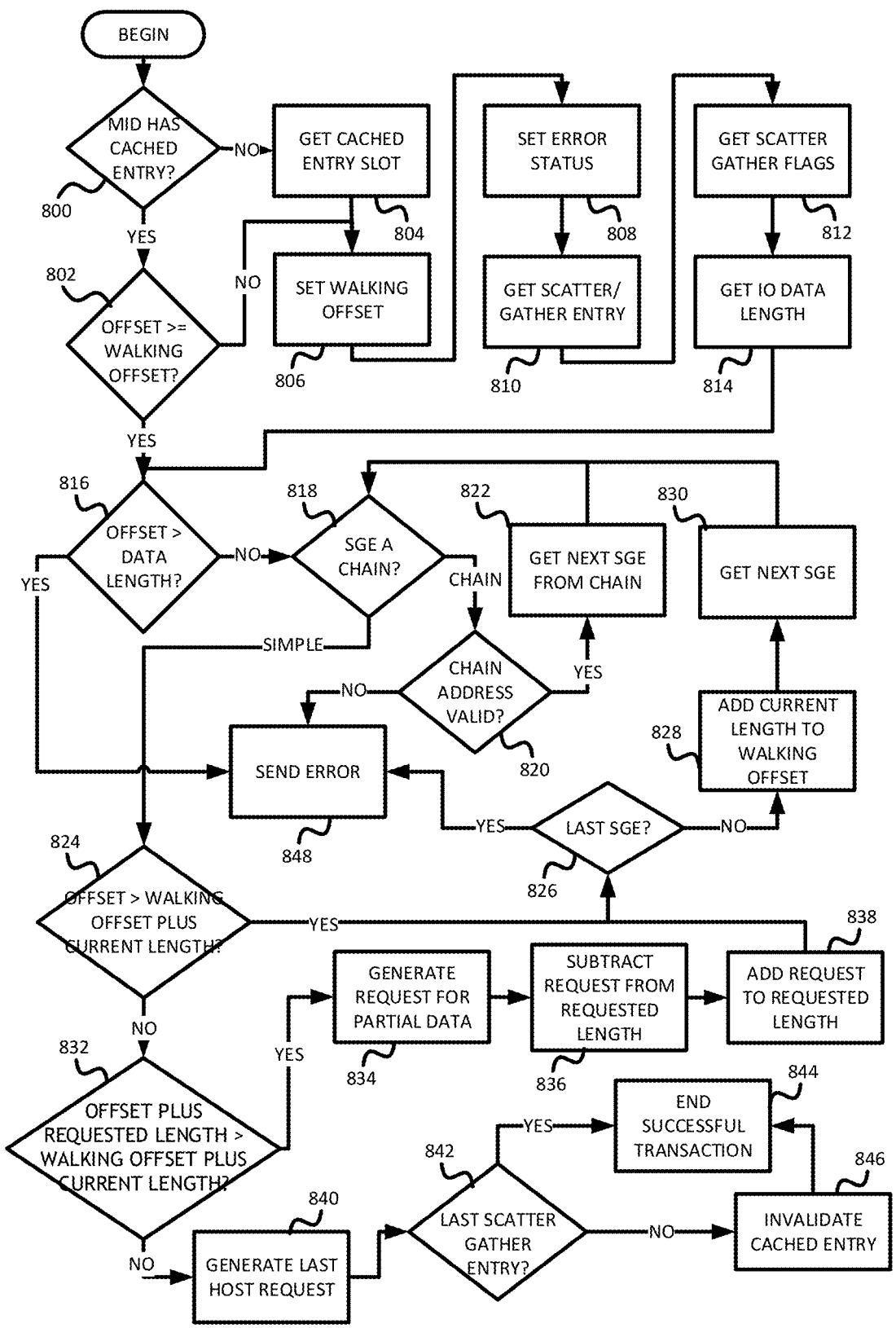
FIG. 8 shows a flowchart for a method of traversing a translation table to implement embodiments of the present invention.

Referring to FIG. 8, a flowchart for a method of traversing a translation table to implement embodiments of the present invention is shown. A system receives a message and associated inputs corresponding to an offset value from the start of a memory area and the size of a data transfer packet. In a system having a cache, a controller determines 800 if the message identifier corresponds to a cached entry. If the message identifier does not correspond to a cached entry, the controller gets 804 a cached entry slot and sets 806 a walking offset to zero. If the message identifier does have a cached entry, the controller determines 802 if the difference between the device side transaction address and the device side base address ("offset") is greater than or equal to a walking offset; if not, the controller sets 806 the walking offset to zero. In a system without a cache, the controller begins by determining 802 if the offset is greater than or equal to a walking offset.

Once the walking offset is set 806 to zero, the controller sets 808 an error status to zero. The controller then gets 810 a translation table entry from a translation table, such as a scatter/gather entry from a scatter/gather list, associated with the message and gets 812 translation table flags from the message. Finally, the controller gets 814 IO data length from the message.

Once the controller has the translation table entry, translation table flags and data length, or if the controller determines 802 that the offset is greater than or equal to the walking offset, the controller determines 816 if the offset is greater than the data length. If the controller determines 816 that the offset is greater than the data length, the controllers sends 848 a completion error message.

If the controller determines 816 that the offset is not greater than the data length, the controller determines 818 if the translation table entry is a chain or simple. If the controller determines 818 that the translation table entry is a chain, the controller determines 820 if the chain address is valid. If the chain address is invalid, the controller sends 848 a completion error message. Otherwise, the controller gets 822 the next translation table entry in the chain location and determines 818 if the new translation table entry is a chain or simple.

When the controller determines 818 that a translation table entry is simple, the controller determines 824 if the offset is greater than the walking offset and current length. If so, the controller determines 826 if the translation table entry is the last translation table entry in the buffer. If the translation table entry is the last translation table entry in the buffer, the controller sends 848 a completion error message. If the offset is not greater than the walking offset and current length, the controller determines 832 if the offset and requested length is greater than the walking offset and current length. If so, the controller generates 834 a host request for partial data. The size of the host request is equal to the request length less the walking offset and length of the current element. The controller then subtracts 836 the host request length from the request length, adds 838 the host request length to the offset and determines 826 if the translation table entry is the last in the buffer. The controller then proceeds as previously described.

If the offset and requested length is not greater than the walking offset and current length, the controller is at the end of the translation table. The controller generates 840 a last host request. If the current translation table entry is the last 842 translation table entry, the controller leaves 844 the cache and the transaction is successful, otherwise the controller invalidates 846 the cached translation table entry and ends 844 with a successful transaction. Alternatively, in a system without a cache, when the controller generates 840 a last host request, the transaction is successful.

A person of ordinary skill in the art would appreciate that the foregoing description represent an exemplary embodiment for walking a scatter/gather list type translation table to determine overruns, underruns and invalid memory addresses. Other methodologies for walking a translation table are contemplated.

Systems according to embodiments of the present invention isolate host side memory address spaces and device side memory address spaces, prevent error propagation, eliminate the requirement of "subtractive" routing and provide a standard scatter/gather list translation mechanism that eliminates host or firmware translation. Embodiments of the present invention also provide an address range on a device side peripheral component interconnect express memory space that allows for a dynamic translation to other memory space addresses, access to host, double data rate, and/or internal memories based on the IO context. Address ranges can provide unique end device identification helpful for error identification and recovery, and unique IO context identification required for context sensitive host address mapping.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A bridge apparatus comprising:
   a processor;
   one or more host ports connected to the processor;
   one or more device ports connected to the processor; and memory in communication with the processor,
wherein the processor is configured to:
  receive a transaction request;
  determine a device interface protocol selected from one of advanced host controller interface (AHCI), non-volatile memory express (NVME), and small computer system interface over peripheral component interconnect express (SOP);
  initiate a device communication process according to the determined device interface;
  produce a scatter/gather list based on and unique to the transaction request, the scatter/gather list including a memory space type and associating one or more host memory addresses in the host memory address space with one or more memory address offsets and transaction sizes; and
  inform a direct memory access redirector that a message identifier is associated with a requestor of the transaction request.

2. The bridge apparatus of claim 1, wherein the processor is further configured to determine a data transfer size based on the transaction request and wherein the memory space type included in the scatter/gather list specifies a host port from among the one or more host ports.

3. The bridge apparatus of claim 1, wherein the processor is further configured to provide a memory address range in the device memory space.

4. The bridge apparatus of claim 3, wherein the processor is further configured to dynamically translate one or more device side memory addresses to one or more host side memory addresses.

5. The bridge apparatus of claim 3, wherein the processor is further configured to dynamically translate one or more device side memory addresses to one or more memory addresses in the memory.

6. The bridge apparatus of claim 5, wherein the processor is further configured to pass the transaction request from one of the one or more host ports to one of the one or more device ports.

7. A memory device controller comprising:
  a processor;
  memory connected to the processor; and
  computer executable program code configured to execute on the processor,
  wherein the computer executable program code is configured to:
    receive a transaction request;
    determine a device interface protocol selected from one of advanced host controller interface (AHCI), non-volatile memory express (NVME), and small computer system interface over peripheral component interconnect express (SOP);
    initiate a device communication process according to the determined device interface;
    produce a scatter/gather list based on the transaction request, the scatter/gather list specifying a memory space type for the transaction request and associating one or more host memory addresses in the host memory address space with one or more memory address offsets and transaction sizes;
    inform a direct memory access redirector that a message identifier is associated with a requestor of the transaction request.

8. The memory device controller of claim 7, wherein the computer executable program code is further configured to determine a data transfer size based on the transaction request and wherein the memory space type included in the scatter/gather list specifies a use of internal memory.

9. The memory device controller of claim 7, wherein the computer executable program code is further configured to provide a memory address range in the device memory space.

10. The memory device controller of claim 9, wherein the computer executable program code is further configured to dynamically translate one or more device side memory addresses to one or more host side memory addresses.

11. The memory device controller of claim 9, wherein the computer executable program code is further configured to dynamically translate one or more device side memory addresses to one or more memory addresses in the memory.

12. The memory device controller of claim 11, wherein the computer executable program code is further configured to pass the transaction request to a host device.

13. A data storage system comprising:
  a memory device controller comprising:
    a processor; and
    memory in communication with the processor; and one or more data storage devices,
  wherein:
    the processor is configured to:
    receive a transaction request;
    determine a device interface protocol selected from one of advanced host controller interface (AHCI), non-volatile memory express (NVME), and small computer system interface over peripheral component interconnect express (SOP);
    initiate a device communication process according to the determined device interface;
    produce a scatter/gather list based on the transaction request, the scatter/gather list specifying a memory space type for the transaction request and associating one or more host memory addresses in the host memory address space with one or more memory address offsets and transaction sizes;
    inform a direct memory access redirector that a message identifier is associated with a requestor of the transaction request.

14. The system of claim 13, wherein the one or more data storage devices are peripheral component interconnect express devices.

15. The system of claim 13, wherein the processor is further configured to determine a data transfer size based on the transaction request and wherein the memory space type included in the scatter/gather list specifies a host port.

16. The system of claim 13, wherein the processor is further configured to provide a memory address range in the device memory space.

17. The system of claim 16, wherein the processor is further configured to dynamically translate one or more device side memory addresses to one or more host side memory addresses.

18. The system of claim 13, wherein the processor is further configured to dynamically translate one or more device side memory addresses to one or more memory addresses in the memory.

19. The system of claim 18, wherein the processor is further configured to provide a memory address range in the device memory space to a host device.

20. The system of claim 19, wherein the processor is further configured to pass a data transfer request from the host device to one of the one or more data storage devices.

* * * * *